United States Patent [19]

Davis et al.

[11] Patent Number: 4,959,420

[45] Date of Patent: Sep. 25, 1990

[54] CHLORINATED EPDM WITH SUPERIOR STABILITY

[75] Inventors: Stephen C. Davis, Bright's Grove; Janet B. Fulton, Sarnia; Peter P. M. Hoang, Clearwater, all of Canada

[73] Assignee: Polysar Limited, Sarnia, Canada

[21] Appl. No.: 430,010

[22] Filed: Nov. 1, 1989

[51] Int. Cl.$^5$ .............................................. C08F 8/22
[52] U.S. Cl. .................................... 525/331.7; 525/141; 525/282; 525/303; 525/304; 525/350; 525/354; 525/387; 525/332.1; 526/336
[58] Field of Search ..................... 525/331.7, 332.1; 526/336

[56] References Cited

U.S. PATENT DOCUMENTS

| | | |
|---|---|---|
| 3,524,826 | 8/1970 | Kresge et al. |
| 3,896,095 | 7/1975 | Morrissey. |
| 3,936,430 | 2/1976 | Schoen et al. ................... 525/331.7 |
| 3,956,247 | 5/1976 | Landi et al. . |
| 4,548,995 | 10/1985 | Kowalski et al. ................ 525/331.7 |
| 4,652,616 | 3/1987 | Kamiya et al. ................... 525/331.7 |
| 4,814,390 | 3/1989 | Tojo et al. ........................ 525/331.7 |

FOREIGN PATENT DOCUMENTS 857383 12/1970 Canada.

Primary Examiner—Bernard Lipman
Attorney, Agent, or Firm—Stevens, Davis, Miller & Mosher

[57] ABSTRACT

A chlorinated ethylene-alpha olefin-nonconjugated diolefin terpolymer having a chlorine content of from about 0.5 to 14 percent by weight characterized by superior viscosity stability on storage or exposure to elevated temperatures is obtained by chlorinating an ethylene-alpha olefin-nonconjugated diolefin terpolymer wherein said nonconjugated diolefin is an acyclic nonconjugated diolefin characterized in that one olefinic bond is monosubstituted and terminal and the other olefinic bond is trisubstituted. A vulcanizable rubber composition comprising said chlorinated ethylene-alpha olefin-nonconjugated diolefin terpolymer and cure active agents is also provided.

11 Claims, No Drawings

CHLORINATED EPDM WITH SUPERIOR STABILITY

FIELD OF INVENTION

This invention relates to a chlorinated ethylene alpha olefin—nonconjugated diolefin terpolymer that exhibits superior viscosity stability during storage and on exposure to the elevated temperatures associated with processing and finishing treatments.

BACKGROUND OF THE INVENTION

Ethylene-propylene-nonconjugated diolefin terpolymers are characterized by an absence of polymer backbone unsaturation which renders these materials extremely resistant to oxidation and ozone. Rubber compounders have attempted to use these low unsaturation ethylene-propylene-nonconjugated diolefin terpolymers in compositions with highly unsaturated elastomeric materials such as natural rubber, styrene-butadiene rubber, polybutadiene rubber and acrylonitrile-butadiene rubber in order that the terpolymers' oxidation and ozone resistance may be imparted to the highly unsaturated rubbers. However their efforts have not been successful due to the fact that the terpolymers will not compatibly cocure with highly unsaturated natural rubbers or diene rubbers in blends such as those that are desirably made in the preparation of stocks for passenger car tires, truck tires, aeroplane tires and heavy duty off-the-road tires.

A technique by which the cure compatibility of butyl rubber with natural rubber and styrene-butadiene rubber has been greatly improved has been by the halogenation of butyl rubber. Although the ethylene-propylene-nonconjugated diolefin terpolymers that are presently commercially available are quite different in structure when compared with butyl rubber, it has also been found that halogenation of these terpolymers likewise results in a marked improvement in their cure compatibility with the highly unsaturated rubbers. Unfortunately, the halogenated ethylene-propylene-nonconjugated diolefin terpolymers in which the nonconjugated diolefin is a monomer such as dicyclopentadiene, 5-ethylidene-2-norbornene, 5-vinyl-2-norbornene or 1,4-hexadiene are found to have poor stability as evidenced by undesirable increases in viscosity during storage or when exposed to elevated temperatures associated with processing or finishing treatments. In addition, known ethylene-propylene-nonconjugated diolefin terpolymer halogenation processes frequently cause an undesirable increase in gel content which seriously detracts from the processability of the material. Thus there is a recognized need in the rubber industry for a halogenated ethylene-propylene-nonconjugated diolefin terpolymer that exhibits a stability on storage and exposure to elevated temperatures superior to that shown by halogenated ethylene propylene-nonconjugated diolefin terpolymers which have been previously synthesized.

DESCRIPTION OF PRIOR ART

U.S. Pat. No. 3,524,826 (Kresge et al) discloses that a terpolymer of ethylene, a $C_3$ to $C_8$ alpha olefin and a $C_5$ to $C_{14}$ nonconjugated diolefin can be reacted with elemental bromine in solution at a temperature between 0° C. and 35° C. to give an additively brominated terpolymer containing between 1 percent and 10 percent by weight bromine.

Canadian Patent No. 857,383 (Morrisey) discloses that a terpolymer of ethylene, an alpha olefin and a nonconjugated diolefin which is preferably 1,4-hexadiene, octadecadiene or dicyclopentadiene may be halogenated with molecular halogen or organic halogen-containing materials at a temperature between 85° C. and 100° C. in the presence of ultraviolet radiation to afford a halogenated terpolymer comprising between 1 percent and 10 percent by weight halogen.

U.S. Pat. No. 3,896,095 (Morrisey) discloses that an ethylene-propylene polyene terpolymer wherein said polyene is a member of the group consisting of the 5-alkylidene-2-norbornenes, the alkenyl-2-norbornenes and the 5-alkadienyl-2-norbornenes may be uniformly halogenated in crumb form in a water slurry, thereby obviating the need to use organic solvents and the attendant demand for recovery thereof. The halogenated terpolymer thus prepared comprises 3 to 6 weight percent halogen, preferably chlorine.

U.S. Pat. No. 3,956,247 (Landi et al) discloses that the solution halogenation of an elastomeric terpolymer of ethylene, an alpha olefin and a nonconjugated diene, preferably 5-ethylidene-2-norbornene in the presence of an epoxy compound such as epoxidized soyabean oil with or without a polyalkylene ether glycol yields a halogenated ethylene-alpha olefin—nonconjugated diolefin with excellent viscosity stability and limited gel content.

SUMMARY OF THE INVENTION

It is an objective of this invention to provide a chlorinated ethylene-alpha olefin—nonconjugated diolefin terpolymer that exhibits superior viscosity stability during storage and upon exposure to elevated temperatures associated with processing and finishing treatments. The nonconjugated diolefin of the base ethylene—alpha olefin—nonconjugated diolefin terpolymer prior to chlorination is an acyclic nonconjugated diolefin with specific structural characteristics.

It is a further objective of this invention to provide a vulcanizable composition of said chlorinated ethylene-alpha olefin—nonconjugated diolefin terpolymer.

Thus in accordance with the present invention there is provided a chlorinated ethylene-alpha olefin—nonconjugated diolefin terpolymer characterized by superior viscosity stability on storage or exposure to elevated temperatures having a chlorine content of from about 0.5 to 14 percent by weight based on the weight of said chlorinated terpolymer wherein the base ethylene-alpha olefin—nonconjugated diolefin terpolymer comprises:

(i) about 40 to 80 mol percent ethylene,
(ii) about 20 to 60 mol percent of a $C_3$ to $C_8$ alpha olefin, and
(iii) about 0.5 to 10 mol percent of a $C_7$ to $C_{16}$ nonconjugated diolefin characterized in that it is an acyclic nonconjugated diolefin wherein one olefinic bond is monosubstituted and terminal and the other olefinic bond is trisubstituted.

In another aspect, our invention provides a vulcanizable rubber composition comprising:

(A) a chlorinated ethylene-alpha olefin—nonconjugated diolefin terpolymer having a chlorine content of from about 0.5 to 14 percent by weight of said chlorinated terpolymer wherein the base ethylene-alpha olefin—nonconjugated diolefin terpolymer comprises:

(i) about 40 to 80 mol percent ethylene, (ii) about 20 to 60 mol percent of a $C_3$ to $C_8$ alpha olefin, and (iii) about 0.5 to 10 mol percent of a $C_7$ to $C_{16}$ nonconjugated diolefin characterized in that it is an acyclic nonconjugated diolefin wherein one olefinic bond is monosubstituted and terminal and the other olefinic bond is trisubstituted, and (B) cure active agents.

DETAILED DESCRIPTION OF THE INVENTION

Now, in accordance with the present invention, it has been found that the chlorinated ethylene-alpha olefin-nonconjugated diolefin terpolymers described herein exhibit superior viscosity stability on storage and on exposure to the elevated temperatures encountered during processing and finishing treatments.

The preparation of the chlorinated ethylene-alpha olefin-nonconjugated diolefin terpolymers of the present invention is accomplished by the halogenation of base ethylene-alpha olefin-nonconjugated diolefin terpolymers. The terpolymers useful in the formation of the products of the present invention contain from about 40 to about 80 mol percent of ethylene, from about 20 to about 60 mol percent of a $C_3$ to $C_8$ alpha-olefin and from about 0.5 to about 10 mol percent of a $C_7$ to $C_{16}$ nonconjugated diolefin. A preferred ethylene-alpha olefin-nonconjugated diolefin terpolymer is characterized in that it contains from about 45 to about 75 mol percent of ethylene, from about 30 to 55 mol percent of said alpha olefin and from about 1 to about 6 mol percent of said nonconjugated diolefin and has a number average molecular weight between 50,000 and 250,000. Suitable $C_3$ to $C_8$ alpha olefins include propylene, 1-butene, 1-hexene, 4-methyl-1-pentene and 1-octene, propylene and 1-butene being especially preferred. A most important feature of this present invention is that the $C_7$ to $C_{16}$ nonconjugated diolefin of the base ethylene-alpha olefin-nonconjugated diolefin terpolymer to be chlorinated, be an acyclic nonconjugated diolefin wherein one olefinic bond is monosubstituted and terminal and the other olefinic bond is trisubstituted. When an ethylene-alpha olefin-nonconjugated diolefin terpolymer in which the diolefin component does not have this particular structure is chlorinated, the resultant chlorinated ethylene-alpha olefin - nonconjugated diolefin terpolymer does not exhibit the superior viscosity stability on storage and exposure to elevated temperatures that is displayed by the chlorinated ethylene-alpha olefin—nonconjugated diolefin terpolymers of the present invention. Representative nonlimiting examples of suitable nonconjugated diolefins that may be used as the third monomer in the terpolymer include 3,7-dimethyl-1,6-octadiene, 7-methyl-1,6-octadiene, 5,7-dimethyl-1,6-octadiene, 6-methyl-1,5-heptadiene and 5-methyl-1,4-hexadiene; 3,7-dimethyl-1,6-octadiene and 7-methyl-1,6-octadiene being especially preferred.

The above described terpolymers are prepared employing techniques well known to those skilled in the art. For example, the terpolymers may be produced by copolymerizing ethylene, an alpha olefin having 3 to 8 carbon atoms and a $C_7$ to $C_{16}$ acyclic nonconjugated diolefin wherein one olefinic bond is monosubstituted and the other olefinic bond is trisubstituted in a reaction medium in the presence of a Ziegler catalyst, comprising, for example, a soluble vanadium compound and an organoaluminum compound while supplying hydrogen gas, diethyl zinc or the like as a molecular weight controlling agent. An aliphatic hydrocarbon such as hexane, heptane or octane, an alicyclic hydrocarbon such as cyclohexane, an aromatic hydrocarbon such as toluene or xylene and a halogenated hydrocarbon such as chlorobenzene, carbon tetrachloride, tetrachloroethylene, methylene dichloride, or dichloroethane may be used as the reaction medium either singly or in admixture. Alternatively the terpolmyers may be produced in a reaction medium comprising said alpha olefin having 3 to 8 carbon atoms and one of the aforesaid hydrocarbons. Examples of the soluble vanadium compound include vanadium tetrachloride, vanadium triacetylacetonate, vanadium trialkoxides and halogenated vanadium alkoxides which may be used either singly or as a mixture. Examples of the organoaluminum compound include triethyl aluminum, diethyl aluminum chloride, and ethyl aluminum sesquichloride which may be used singly or as a mixture.

The base terpolymers used in the present invention may also be produced by copolymerizing ethylene, an alpha olefin having 3 to 8 carbon atoms and the alicyclic nonconjugated diolefin with the specific structural characteristics as hereinbefore described in a reaction medium in the presence of a soluble chiral or nonchiral metallocene catalyst and a methyl aluminoxane cocatalyst at a temperature between −60° C. and 110° C. An alicyclic hydrocarbon such as cyclohexane or an aromatic hydrocarbon such as toluene or xylene may be used as the reaction medium either singly or in admixture. Examples of the chiral metallocene catalyst include compounds of the formula

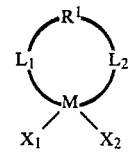

where M is a group IVb metal selected from titanium, hafnium and zirconium, $X_1$ and $X_2$ may be the same or different and are selected from bromine, chlorine and methyl, $L_1$ and $L_2$ are the same or different and each is a cyclopentadienyl ligand, and $R^1$ is a $C_{1-20}$ hydrocarbon which is bonded to said $L_1$ and said $L_2$. Examples of the nonchiral metallocene catalyst include compounds of the formula

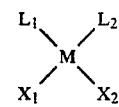

where M is a group IV b metal selected from titanium, hafnium and zirconium, $X_1$ and $X_2$ may be the same or different and are selected from bromine, chlorine and methyl, $L_1$ and $L_2$ are the same or different and each is a cyclopentadienyl type ligand. The methyl aluminoxane cocatalyst used in conjunction with the chiral or nonchiral metallocene catalyst is prepared by carefully reacting trimethyl aluminum with aluminum sulphate hexadecahydrate in a solution of toluene.

According to the present invention, the herein before described terpolymers are chlorinated, using methods well known in the art, to yield a terpolymer containing from about 0.5 to 14 percent by weight chlorine, preferably about 2 to 7 percent by weight chlorine, based on the weight of said chlorinated terpolymer.

The chlorinating agent used may be molecular chlorine or it may be an organic chlorine compound of which representative nonlimiting examples include N-chloro succinimide, 1,3-dichloro-5,5-dimethylhydantoin and N-chloro-N-cyclohexylbenzene sulphonamide; 1,3-dichloro-5,5-dimethyl hydantoin being preferred.

The preferred method for preparing the chlorinated ethylene-alpha olefin-nonconjugated diolefin terpolymers of the present invention involves dissolution of the base terpolymer in a suitable inert organic solvent which may be a saturated aliphatic hydrocarbon such as hexane or heptane; an aromatic hydrocarbon such as toluene or mixed xylenes; an alicyclic hydrocarbon such as cyclohexane or methyl cyclohexane; or halogenated derivatives of the above hydrocarbons such as chloroform, carbon tetrachloride and the like to afford a 3 to 15 weight percent solution. There may also be dispersed about 10 percent by volume of water in this polymer solution to facilitate the removal of the hydrogen chloride generated during the chlorination of the base terpolymer. To this polymer solution there is added with agitation molecular chlorine, preferably dissolved in a suitable solvent such as chloroform or carbon tetrachloride, in a quantity sufficient to achieve the desired level of chlorination. Preferably the reaction is carried out in the absence or near absence of light. The chlorination reaction can be conducted at a temperature ranging from about 0° C. to 50° C., preferably from about 15° C. to 35° C. After a reaction time of about 3 minutes to 15 minutes, a solution of an alkaline reagent, preferably either an aqueous sodium hydroxide solution of about 5 weight percent or an aqueous potassium hydroxide solution of about 5 weight percent, is added to the polymer solution to neutralize the excess chlorine and hydrogen chloride formed during the chlorination reaction. After about 10 minutes the polymer solution is washed with water to remove the inorganic salts and then suitable stabilizers and antioxidants are added. Examples of suitable stabilizers include calcium stearate and epoxidized soyabean oil, preferably used in the amount of about 0.05 to 5 parts by weight per hundred parts by weight of said chlorinated terpolymer. Suitable antioxidants include sterically hinered phenols, preferably used in the amount of about 0.05 to 2 parts by weight per hundred parts by weight of said chlorinated terpolymer. Recovery of said chlorinated terpolymer is achieved by conventional techniques used to recover rubbery polymers including (i) contacting the polymer solution with steam thereby flashing off the solvent (ii) passing the wet polymer over a screen or filter in order to recover the polymer and (iii) passing the polymer through a tunnel dryer or extruder. The chlorinated terpolymer may also be recovered by coagulation with an excess of an organic liquid in which the chlorinated polymer is sparingly soluble, examples of such a liquid being methanol, isopropanol or acetone.

Chlorination of the base ethylene-alpha olefin-nonconjugated diolefin terpolymer may also be accomplished by reaction of said terpolymer with an organic chlorinating reagent. A quantity of the organic chlorinating reagent sufficient to achieve the desired level of chlorination is added to a solution of said base terpolymer in an appropriate inert organic solvent, preferably dichloromethane, chloroform or carbon tetrachloride. The reaction may be carried out at a temperature of about 15° C. to about 30° C. or, alternatively, in the presence of a free radical initiator such as an organic peroxide, at a more elevated temperature of about 50° C. to 90° C. The reaction period may extend from about one hour to about 24 hours, preferably from about one hour to about 16 hours when the reaction is carried out in the absence of a free radical initiator and from about one hour to about 4 hours when the reaction is carried out in the presence of a free radical initiator. The polymer solution is decanted from any insoluble by-products that settle out. Stabilization and isolation of the chlorinated terpolymer thus produced is accomplished as hereinbefore described.

Chlorination by either molecular chlorine or an organic chlorine compound of the base ethylene-alpha olefin-nonconjugated diolefin terpolymers of the present invention is believed to occur by a predominantly substitution mechanism wherein one chlorine atom is substituted for a hydrogen atom in the position allylic to the double bond thereby giving rise to chlorinated ethylene-alpha olefin-nonconjugated diolefin terpolymers with allylic chloride structures analogous to the structures of the allylic chlorides formed upon chlorination of butyl rubber. While not wishing to be bound by any theories it is believed that it is the similarity of the structures of the allylic chlorides in the chlorinated ethylene alpha olefin-nonconjugated diolefin terpolymers of the present invention to the structures of the allylic chlorides in chlorobutyl rubber that accounts for the superior stability on storage or exposure to elevated temperatures exhibited by said chlorinated ethylene-alpha olefin-nonconjugated diolefin terpolymers.

The chlorine containing terpolymers of the present invention, prepared by chlorination of the base ethylene-alpha olefin-nonconjugated diolefin terpolymers as hereinbefore described can be cured with a variety of curing systems to afford vulcanizates that possess a desirable balance of physical properties. The vulcanizing agent may, for example, be a metal salt, a sulphur-containing compound, an organic peroxide or an alkyl phenol-formaldehyde resin or a combination of these. A typical curing system comprises: (i) a metal oxide, (ii) elemental sulphur and (iii) at least one sulphur based accelerator. The use of metal oxides as a component in the curing system is well known in the art. A suitable metal oxide is zinc oxide which is used in amounts of from about 1 to 10, preferably from about 2 to about 5, parts by weight per 100 parts by weight chlorinated terpolymer. Elemental sulphur, comprising component (ii) of said curing system is used in amounts of from about 0.2 to about 2 parts by weight per 100 parts by weight chlorinated terpolymer. Suitable sulphur based accelerators (component (iii) of said curing system) are used in amounts of from about 0.5 to about 3 parts by weight per 100 parts by weight chlorinated terpolymer and may be selected from the thiuram sulphides such as tetramethyl thiuram disulhpide (TMTD), the thiocarbamates such as zinc dimethyl dithiocarbamate (ZDC) and the thiazyl and benzothiazyl compounds such as mercaptobenzothiazyl disulphide (MBTS). Preferably the sulphur based accelerator is mercaptobenzothiazyl disulphide.

Another typical curing system comprises: (i) an organic peroxide and (ii) a peroxide activator. Representative organic peroxides include di-tert-butyl peroxide, 2,5-dimethyl-2,5-di(tert-butyl peroxy) hexane and dicumyl peroxide (DiCup 40 [tradename]) and are used in the amount of from about 0.5 to 5, preferably from about 1 to 3 parts by weight per 100 parts by weight chlorinated terpolymer. Examples of the peroxide activator used in combination with the organic peroxide include quinone dioxime compounds such as p-quinonedioxime, methacrylate compounds such as polyethylene glycol dimethacrylate and maleimide compounds such as N,N'-m-phenylene dimaleimide (HVA-2 [tradename]). The peroxide activator is used in an amount of from about 0.5 to 5, preferably from about 1 to 3 parts by weight per 100 parts by weight chlorinated terpolymer.

The chlorinated ethylene-alpha olefin—nonconjugated diolefin terpolymers of the present invention may also be vulcanized using the cure system comprising (i) a metal oxide and (ii) an alkyl phenol formaldehyde resin. A suitable metal oxide is zinc oxide which is used in amounts of from about 1 to 10, preferably from about 2 to about 5, parts by weight per 100 parts by weight chlorinated terpolymer. The second component of the cure system the alkyl phenol formaldehyde resin, a representative example of which is the commercially available SP-1045 (tradename) is used in the amount of from about 0.5 to 5 parts, preferably about 1 to 4 parts by weight per 100 parts by weight chlorinated terpolymer.

The use of reinforcing agents such as various carbon blacks and finely divided silica to impart improved strength properties to the final vulcanizate is well known in the art. Suitable carbon blacks for practising this invention are the well known furnace and channel, preferably furnace blacks and are used in the amounts of from about 30 to about 100, preferably from about 50 to about 80, parts by weight per 100 parts by weight chlorinated terpolymer.

Hydrocarbon extender oil, antioxidants, antiozonants, processing aids and tackifiers may also be added in the usual way and in the normal amounts for compounding ethylene-alpha olefin-nonconjugated diolefin-type rubbery polymers.

The procedure of mixing the various components of the vulcanizable rubber compositions of this invention is not specifically restricted. Generally, it is preferred to carry out the compounding procedure in two stages. In the first stage the polymer may be mixed with the conventional compounding ingredients which may include carbon black, hydrocarbon extender oil, antioxidants, processing aids and tackifiers. In the second stage of the compounding procedure, the cure active agents are preferably added to the compound described above on a rubbermill or in an internal mixer operated at a temperature normally not in excess of about 60° C. The compounds are cured in a conventional manner by heating from about 5 to about 60 minutes at temperatures of from about 150° C. to about 200° C. to form elastomeric vulcanizates which demonstrate a desirable balance of physical properties. By physical properties is meant hardness, elongation and strength properties which include modulus at 100 percent elongation, modulus at 300 percent elongation and tensile strength at rupture. Accordingly, said vulcanizates are suitable for use in articles where conventional chlorinated ethylene-propylene-nonconjugated diolefin terpolymers based on the nonconjugated diolefins 2-ethylidene-5-norbornene, dicyclopentadiene and 1,4-hexadiene are presently used.

The following examples illustrate the present invention and are not intended to limit the scope thereof. All parts are parts by weight unless otherwise specified.

EXAMPLE 1

An ethylene-propylene-7-methyl-1,6-octadiene terpolymer rubber was prepared by polymerizing ethylene, propylene and 7-methyl-1,6-octadiene in toluene at −5° C. using the chiral metallocene bis(tetrahydroindenyl)ethane zirconium dichloride and methyl aluminoxane catalyst system. Characterization of the terpolymer by nuclear magnetic resonance (NMR) and infrared (IR) spectroscopy and gel permeation chromatography (GPC) in which the molecular weights were determined as polystyrene molecular weight equivalents showed that the terpolymer rubber comprised 50 mol percent ethylene, 49 mol percent propylene and 1.6 mol percent 7-methyl-1,6-octadiene, had a number average molecular weight ($M_n$) 127,000, a weight average molecular weight ($M_w$) 348,600 and a polydispersity ($M_w/M_n$) of 27.5.

One hundred grams of said terpolymer rubber was dissolved in 1000 ml of n-hexane. To this cement in a 3-litre glass reactor equipped with a stirrer and an inlet valve was added 100 ml of water and the resultant mixture was stirred vigorously for 10 minutes to ensure complete dispersion of the water in the cement. The reactor was wrapped with aluminum foil in order to keep it free of ambient light and then 3.1 grams of chlorine in about 50 ml of carbon tetrachlorine was added with agitation. After 3 minutes 1.9 grams of sodium hydroxide in about 40 ml of water was added and the reaction mixture was stirred vigorously for a further 10 minutes in order to ensure complete neutralization of the hydrogen chloride generated during the reaction. The polymer was then coagulated by pouring the reaction mixture into about 3500 ml of methanol. The polymer was washed thoroughly three times with methanol, allowed to drain at room temperature and dried in a vacuum oven for about 6 hours at ambient temperature. The polymer, together with 0.2 grams Irganox 1076(tradename), 0.5 grams calcium stearate and 0.1 gram Paraplex G-62(tradename), were dissolved in 1000 ml of n-hexane. The polymer was then coagulated by pouring the polymer solution into about 3000 ml of acetone. The polymer was allowed to drain at room temperature, dried in a vacuum oven for about 16 hours at ambient temperature and finally on a two-roll mill at approximately 50° C. The chlorinated terpolymer thus obtained contained 1.8 weight percent chlorine and had a Mooney viscosity (ML 1+4 at 100° C.) of 47.

The long term stability of the chlorinated terpolymer was evaluated by carrying out an accelerated aging study whereby 35 gram samples of the polymer, wrapped in polyethylene film, were aged in a hot air oven at 80° C. for 2 days, 7 days and 20 days and the Mooney viscosities of the respective samples then determined. The results, which are given in Table I, show that there was essentially no change in the Mooney viscosity over the time period, thereby demonstrating the inherent stability of the chlorinated terpolymer.

EXAMPLE 2

This example is outside the invention and is included for purposes of comparison.

The procedure of Example 1 was essentially followed except that one hundred grams of an ethylene-propylene-5-ethylidene-2-norbornene terpolymer designated EPDM 345, sold by Polysar Limited, Sarnia, Ontario, Canada was used. This polymer has an ethylene:propylene weight ratio of 74:26, and contains 4.3 weight percent, based on the EPDM, of 5-ethylidene 2-norbornene and has an $M_n$ 110,000, $M_w$ 262,000, and $M_w/M_n$ 2.4. For the chlorination reaction 2.55 grams of chlorine in about 40 ml of carbon tetrachloride was utilized and for neutralizing the hydrogen chloride formed in said reaction, 1.6 grams of sodium hydroxide in about 30 ml of water was used. The chlorinated terpolymer thus obtained contained 1.1 weight percent chlorine and had a Mooney viscosity (ML 1+4 at 100° C.) of 45.

An accelerated aging study of the polymer, the results of which are given in Table I, revealed that there was a continual increase in the Mooney viscosity during the twenty days.

EXAMPLE 3

The procedure of Example 1 was essentially followed with exception that the base ethylene-propylene-7-methyl-1,6-octadiene terpolymer rubber comprised 56 mol percent ethylene, 38 mol percent propylene and 6 mol percent 7-methyl-1,6-octadiene, had an $M_n$ 111,000, $M_w$ 303,000 and $M_w/M_n$ 2.7. Chlorination of said terpolymer was accomplished using 10.9 grams of chlorine in about 160 ml of carbon tetrachloride and neutralization of the hydrogen chloride formed in said reaction was carried out using 6.7 grams of sodium hydroxide in about 130 ml of water. The chlorinated terpolymer thus obtained contained 5.3 weight percent chlorine and had a Mooney viscosity (ML 1+4 at 100° C.) of 27.

An accelerated aging study of said chlorinated terpolymer, the results of which are given in Table I, revealed that there was essentially no change in the Mooney viscosity over the twenty days.

EXAMPLE 4

This example is outside the invention and is intended for purposes of comparison.

The procedure of Example 1 was essentially followed except that one hundred grams of an ethylene-propylene-5-ethylidene-2-norbornene terpolymer designated EPDM 585, sold by Polysar Limited, Sarnia, Ontario, Canada was used. This polymer has an ethylene:propylene weight ratio of 62:38, and contains 10.9 weight percent, based on the EPDM, of 5-ethylidene-2-norbornene and has an $M_n$ 119,000, $M_w$ 312,000 and $M_w/M_n$ 2.6.

For the chlorination reaction 6.4 grams of chlorine in about 100 ml of carbon tetrachlorine was utilized and neutralization of the hydrogen chloride formed in said reaction was accomplished using 4.0 grams of sodium hydroxide in about 80 ml of water. The chlorinated terpolymer thus obtained contained 1.5 weight percent chlorine and had a Mooney viscosity (ML 1+4 at 100° C.) of 81.

An accelerated aging study of said chlorinated terpolymer, the results of which are given in Table I, revealed that there was a very substantial increase in the Mooney viscosity within 2 days and that within 7 days said chlorinated terpolymer had become crosslinked to such an extent that it was no longer possible to obtain a value for the Mooney viscosity.

TABLE I

| (ML 1 + 4 at 100° C.) | 1 | 2 (comparative) | 3 | 4 (comparative) |
|---|---|---|---|---|
| Unaged | 47 | 45 | 27 | 81 |
| Aged 2 days at 80° C. | 47 | 49 | 30.5 | 200 |
| Aged 7 days at 80° C. | 48 | 54 | 31 | crumb |

TABLE I-continued

| (ML 1 + 4 at 100° C.) | 1 | 2 (comparative) | 3 | 4 (comparative) |
|---|---|---|---|---|
| Aged 20 days at 80° C. | 49.5 | 61 | 33.3 | crumb |

A comparison of the results of the accelerated aging studies of the two chlorinated ethylene-propylene-7-methyl-1,6-octadiene terpolymers with those of the accelerated aging studies of the two chlorinated ethylene-propylene-5-ethylidene-2-norbornene terpolymers under identical conditions clearly demonstrates the importance of the structure of the nonconjugated diolefin in the base ethylene-propylene-nonconjugated diolefin terpolymer to the eventual long term stability of the chlorinated terpolymer. It is only when the nonconjugated diolefin in the base terpolymer is an acyclic nonconjugated diolefin wherein one olefinic bond is monosubstituted and terminal and the other olefinic bond is trisubstituted that a chlorinated ethylene-propylene-nonconjugated diolefin with superior viscosity stability can be obtained by chlorination of said base terpolymer.

EXAMPLE 5

Five elastomeric formulations according to the present invention, and consisting of a chlorinated ethylene-propylene-7-methyl-1,6-octadiene terpolymer as the only elastomer, were prepared, cured and tested. For comparison purposes formulations containing chlorinated ethylene-propylene-5-ethylidene-2-norborene terpolymer were prepared, cured and similarly tested.

In the formulations according to the invention, the terpolymer used was an chlorinated ethylene-propylene-7-methyl-1,6-octadiene terpolymer having a chlorine content of 1.2 weight percent based on the weight of said chlorinated terpolymer, wherein the base ethylene-propylene-7-methyl-1,6-octadiene terpolymer comprised 59 mol percent ethylene, 42 mol percent propylene and one mol percent 7-methyl-1,6-octadiene. The chlorinated terpolymer had $M_n$ 100,000, $M_w$ 223,000 and $M_w/M_n$ 2.2.

In the comparison formulations, the terpolymer used was a freshly prepared chlorinated ethylene-propylene-5-ethylidene-2-norbornene terpolymer having a chlorine content of 1.1 weight percent based on the weight of said chlorinated terpolymer, wherein the base ethylene-propylene-5-ethylidene-2-norbornene terpolymer designated EPDM 345 and sold by Polysar Limited, Sarnia, Ontario, Canada has an ethylene:propylene weight ratio of 74:26 and contains 4.3 weight percent based on the EPDM, of 5-ethylidene-2-norbornene. The chlorinated terpolymer had $M_n$ 110,000, $M_w$ 262,000, and $M_w/M_n$ 2.4.

The ten chlorinated ethylene-propylene-nonconjugated diolefin terpolymer compounds were prepared according to the general recipe shown in Table II. The materials used were carbon black, an N-660 type commercial product and paraffinic oil, commercial product sold as Sunpar 2280.

Zinc oxide (vulcanization agent), sulphur (vulcanization agent), TMTD (tetramethylthiurarm disulphide:accelerator), MBTS (mercaptobenzothiazyl disulphide:accelerator), DiCup 40C (dicumyl peroxide on precipitated calcium carbonate:vulcanization agent), HVA-2 (N-N'-m-phenylene dimaleimide:accelerator) and SP-1045 (alkyl phenol formaldehyde resin:vulcanization agent) were commercially available materials.

Compounding was done by mixing all the components with the exception of the cure active agents on a two roll rubbermill. The temperature of the mill at commencement of the mixing procedure was ambient temperature and the mixing cycle was completed in about 10 to 15 minutes. Compounding was completed by adding the remaining ingredients on the two roll rubbermill at ambient temperature. The compounded stocks were formed into sheets and vulcanized in a Preco press at 166° C. under a pressure of 35,000 psi for times varying from about 5 minutes to about 60 minutes; the cure time being dependent upon the particular cure system used.

Tensile strength, modulus at 100 percent and 300 percent elongation and ultimate elongation to break were determined according to ASTM-D 412-80. Hardness was determined using a Type A shore durometer according to ASTM D 2240-81. The test results on the vulcanizates are provided in Table III.

The test results indicate that vulcanizates derived from rubber compositions of this invention possess the necessary balance of physical properties which renders them useful as replacements for the control formulations.

TABLE II

| | Sample No. | | | | | | | | | |
|---|---|---|---|---|---|---|---|---|---|---|
| | 1 | 2 | 3 | 4 | 5 | 6 | 7 | 8 | 9 | 10 |
| Chlorinated exptl. polymer | 100 | 100 | 100 | 100 | 100 | — | — | — | — | — |
| Chlorinated EPDM 345 | — | — | — | — | — | 100 | 100 | 100 | 100 | 100 |
| Stearic acid | 1 | 1 | 1 | — | 1 | 1 | 1 | 1 | — | 1 |
| Carbon black | 50 | 50 | 50 | 50 | 50 | 50 | 50 | 50 | 50 | 50 |
| Sunpar 2280 | 10 | 10 | 10 | — | 10 | 10 | 10 | 10 | — | 10 |
| Zinc oxide | 5 | 5 | 5 | — | 5 | 5 | 5 | 5 | — | 5 |
| TMTD | — | 0.25 | — | — | — | — | 0.25 | — | — | — |
| MBTS | — | — | 1.25 | — | — | — | — | 1.25 | — | — |
| Sulphur | — | — | 0.5 | — | — | — | — | 0.5 | — | — |
| DiCup 40C | — | — | — | 1.5 | — | — | — | — | 1.5 | — |
| HVA-2 | — | — | — | 1.5 | — | — | — | — | 1.5 | — |
| SP - 1045 | — | — | — | — | 1.75 | — | — | — | — | 1.75 |

TABLE III

| | Sample No. | | | | | | | | | |
|---|---|---|---|---|---|---|---|---|---|---|
| | 1 | 2 | 3 | 4 | 5 | 6 | 7 | 8 | 9 | 10 |
| VULCANIZATE PROPERTY | | | | | | | | | | |
| Hardness, Shore A | 60 | 58 | 61 | 66 | 61 | 54 | 60 | 57 | 52 | 56 |
| 100% Modulus MPa | 1.7 | 2.4 | 1.7 | 2.3 | 1.9 | 1 | 1.2 | 1.4 | 1.1 | 1 |
| 300% Modulus MPa | 6.8 | 10 | 6.4 | — | 7.9 | 2.4 | 3.9 | 6.9 | 2.8 | 2.9 |
| Tensile Strength MPa | 9.3 | 11.5 | 13.7 | 5.5 | 10.7 | 13.1 | 10.8 | 20.8 | 11.2 | 12.1 |
| Elongation % | 390 | 330 | 535 | 165 | 385 | 835 | 545 | 655 | 785 | 710 |

What is claimed is:

1. A chlorinated ethylene-alpha olefin-nonconjugated diolefin terpolymer characterized by superior stability on storage or exposure to elevated temperatures having a chlorine content of from about 0.5 to 14 percent by weight based on the weight of said chlorinated terpolymer wherein the base ethylene-alpha olefin-nonconjugated diolefin terpolymer comprises:
   (i) about 40 to 80 mol percent ethylene,
   (ii) about 20 to 60 mol percent of a $C_3$ to $C_8$ alpha olefin, and
   (iii) about 0.5 to 10 mol percent of a $C_7$ to $C_{16}$ nonconjugated diolefin characterized in that it is an acyclic nonconjugated diolefin wherein one olefinic bond is monosubstituted and terminal and the other olefinic bond is trisubstituted.

2. The chlorinated terpolymer of claim 1 wherein said $C_3$ to $C_8$ alpha olefin is selected from the group consisting of propylene and 1-butene.

3. The chlorinated terpolymer of claim 2 wherein said $C_3$ to $C_8$ alpha olefin is propylene.

4. The chlorinated terpolymer of claim 3 wherein said nonconjugated diolefin is selected from the group consisting of 3,7-dimethyl-1,6-octadiene, 5,7-dimethyl-1,6-octadiene, 7-methyl- 6-octadiene, 5-methyl-1,4hexadiene and 6-methyl-1,5-heptadiene.

5. The chlorinated terpolymer of claim 4 wherein said nonconjugated diolefin is selected from the group consisting of 3,7-dimethyl-1,6-octadiene and 7-methyl-1,6-octadiene.

6. The chlorinated terpolymer of claim 1 having a chlorine content of from about 2 to about 7 percent by weight based on the weight of said chlorinated terpolymer wherein the base ethylene-alpha olefin-nonconjugated diolefin terpolymer comprises:
   (i) about 40 to 80 mol percent ethylene,
   (ii) about 20 to 60 mol percent of a $C_3$ to $C_8$ alpha olefin, and
   (iii) about 1 to 6 mol percent of a $C_7$ to $C_{16}$ nonconjugated diolefin characterized in that it is an acyclic nonconjugated diolefin wherein one olefinic bond is monosubstituted and terminal and the other olefinic bond is trisubstituted.

7. The chlorinated terpolymer of claim 6 wherein said $C_3$ to $C_8$ alpha olefin is selected from the group consisting of propylene and 1-butene.

8. The chlorinated terpolymer of claim 7 wherein said $C_3$ to $C_8$ alpha olefin is propylene.

9. The chlorinated terpolymer of claim 7 wherein said nonconjugated diolefin is selected from the group consisting of 3,7-dimethyl-1,6-octadiene, 5,7-dimethyl-1,6-octadiene, 7-methyl-1,6-octadiene, 5-methyl-1,4-hexadiene and 6-methyl-1,5-heptadiene.

10. The chlorinated terpolymer of claim 9 wherein said nonconjugated diolefin is selected from the group consisting of 3,7-dimethyl-1,6-octadiene and 7-methyl-1,6-octadiene.

11. The chlorinated terpolymer of claim 10 wherein said base ethylene-propylene-nonconjugated diolefin terpolymer comprises:
  (i) about 45 to 75 mol percent ethylene,
  (ii) about 30 to 55 mol percent propylene, and
  (iii) about 1 to 6 mol percent of a nonconjugated diolefin selected from the group consisting of 3,7-dimethyl-1,6-octadiene and 7-methyl-1,6-octadiene.

* * * * *